United States Patent [19]
van Tetering et al.

[11] Patent Number: 5,570,357
[45] Date of Patent: Oct. 29, 1996

[54] TESTING THE CHARACTERISTICS OF AN ATM CONNECTION BETWEEN TWO POINTS OF AN ATM NETWORK USING ATM TEST CELLS

[75] Inventors: Johannes A. M. van Tetering, Zevenbergen, Netherlands; Frank L. Denissen, Boom, Belgium

[73] Assignee: Alcatel N.V., Amsterdam, Netherlands

[21] Appl. No.: 903,364

[22] Filed: Jun. 24, 1992

[30] Foreign Application Priority Data

Jun. 28, 1991 [BE] Belgium .................................. 9100619

[51] Int. Cl.⁶ .......................... G01R 31/28; G06F 11/00
[52] U.S. Cl. .......................... 371/20.1; 371/27; 371/20.4
[58] Field of Search .................................. 371/20.1, 20.4, 371/27, 67.1, 61, 68.2, 5.1

[56] References Cited

U.S. PATENT DOCUMENTS

| | | | |
|---|---|---|---|
| 4,320,881 | 3/1982 | Campbell | 371/20.4 |
| 4,428,076 | 1/1984 | Schoun | 371/20.4 |
| 4,551,833 | 11/1985 | Turner | 370/60 |
| 4,701,919 | 10/1987 | Naitoh et al. | 371/21.1 |
| 5,163,057 | 11/1992 | Grupp | 371/20.4 |
| 5,251,204 | 10/1993 | Izawa et al. | 371/20.1 |
| 5,392,314 | 2/1995 | Wolf | 375/10 |
| 5,422,891 | 6/1995 | Bushnell et al. | 371/22.4 |

FOREIGN PATENT DOCUMENTS

| | | |
|---|---|---|
| 0229353 | 7/1987 | European Pat. Off. . |
| 0317683 | 5/1989 | European Pat. Off. . |
| 0402741 | 12/1990 | European Pat. Off. . |
| 2217553 | 10/1989 | United Kingdom . |

*Primary Examiner*—Hoa T. Nguyen
*Attorney, Agent, or Firm*—Ware, Fressola, Van Der Sluys & Adolphson

[57] ABSTRACT

A method and device for testing ATM connections, wherein the contents of the information part of test cells are repeated, including time indication, sequence number within a connection and connection number. The repetition of the contents occurs in octet pairs with the second octet in each pair being the inverse of the first octet in the pair.

25 Claims, 3 Drawing Sheets

TESTING THE CHARACTERISTICS OF AN ATM CONNECTION BETWEEN TWO POINTS OF AN ATM NETWORK USING ATM TEST CELLS

TECHNICAL FIELD

The present invention relates to a method for testing the characteristics of an ATM connection, to a test cell generator with devices for generating the data sequence of an ATM test cell and to an evaluation circuit for testing ATM test cells.

BACKGROUND OF INVENTION

In ATM systems errors of various kinds may occur and must all be detected in whatever way. For instance, an error is certainly present when no bit or cell synchronisation can be performed. Also the absence of response to whatever questions should be recognized as an error. It is also known to include in the information part of an ATM cell an error protection code to detect transmission errors.

Not all kinds of errors can be detected. This is the case with errors which occur only spuriously, although such errors adversely affect the transmission quality of an ATM connection between two points of an ATM network.

SUMMARY OF THE INVENTION

A solution to this problem is given by a method for testing the characteristics of an ATM connection between two points of an ATM network, characterized in that a sequence of test cells is transmitted and tested, the information parts of said cells being built up in an appropriate way for the purpose of recognizing predetermined characteristics of the connection. This method is preferably performed by means of a test cell generator with devices for generating the data sequence of an ATM test cell, characterized in that the devices are executed in such a way that the data sequence may selectively, and at least piecewise, be generated in non-inverse form or in inverse form and of an evaluation circuit for testing ATM test cells, characterized in that it includes a cell header recognition circuit (HIDC) which by comparing the cell with a test cell is able to determine if an incoming cell is destined to the evaluation circuit (CELC REC) or not.

The basic idea of this solution is the realization of test connections with a sequence of test cells suitably built up.

Preferred embodiments are apparent from the subclaims. A suitably built up test cell , just as every ATM cell, comprises a cell header and an information part, the information part according to the invention having twice the same contents, including a time indication, a connection number and a sequence number of the cell in a connection. The repetition of the contents happens in inverse form, Preferably each octet should be followed by its inverse.

In this way substantially all characteristics of an ATM connection can be tested. This method is also advantageous in that in the information part the numbers of zeroes and ones are equal so that the parity is not affected. Also the method can be executed by simple means.

BRIEF DESCRIPTION OF THE DRAWINGS

The above mentioned features and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
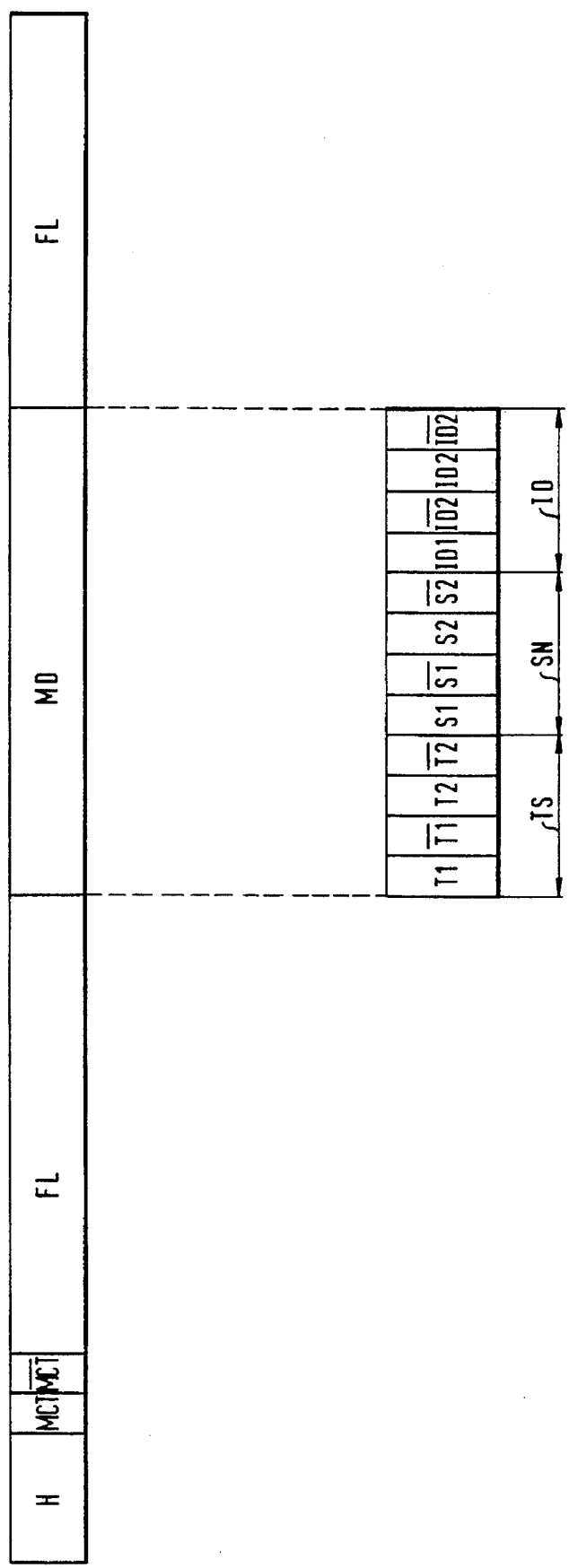
FIG. 1 shows the structure of an ATM test cell according to the invention.

In a schematic way the first line of FIG. 1 shows the structure of a complete ATM test cell. The cell begins with a header H comprising five octets or bytes. This cell header H is used in a known way to transfer the cell to a predetermined destination within an ATN network. The structure of this cell header is not characteristic for the invention and the cell header may be changed on purpose within the course of a connection. It can therefore not be included in the test. For the present invention it is also without importance which kind of connection to be tested is concerned, i.e. if a connection between two points within an exchange is concerned or if a connection between two distant points is tested or if a loop which is built up and tested is concerned.

The header H for instance contains a pair of bits, hereinafter called PT, serving to distinguish test and maintenance cells from data cells within a connection, whereas the first octet MCT of the information part following the cell header H is used to distinguish test cells from maintenance cells. MCT is provided with a predetermined code to distinguish a test cell from a maintenance cell. The octet following MCT, $\overline{MCT}$, is the inverse of MCT, and both octets together, MCT and $\overline{MCT}$, may be used to detect bit errors. This inversion is performed in such a way that every bit is inverted.

MCT and $\overline{MCT}$ are followed by 18 octets which alternately contain either only ones or zeroes. Each pair of such octets constitutes a flag FL. These 18 octets have three purposes. First, error which cause the contents of the octets to remain continuously on zero or on one should be recognized. Secondly, two types of ATM test cells should be distinguished from each other, namely a TYPE-1 cell the data of which are transmitted in a non-inverted way and is followed by their inverse form, e.g., 101010101010101010, and a TYPE-0 cell the data of which are inverted, the following inverted octet then containing the non inverted data, e.g., 010101010101010101. Each pair of ochers is finally also used to detect bit errors.

Measurement data MD follow these 18 octets. Three different measurement data are transmitted, namely a time indication TS, a sequence number SN of the cell in the connection, and a connection number ID. These three measurement data are each time transmitted as 16-bit words. For a TYPE-1 cell (TIC) the transfer is performed in the order T1, $\overline{T1}$, T2, $\overline{T2}$, etc. as represented in FIG. 1.

The time indication TS is used to take the variation in transfer time (delay time) into account. The sequence number SN is used to detect the disappearance or repetition of a cell. A faulty connection number ID indicates that a cell of another connection has erroneously appeared in this connection and that the cell header thus has been modified erroneously.

The rest of the test cell is completed with octets which again alternately contain only ones or only zeroes. By inverting octet per octet inside the whole information part, no part of the cell is left out of consideration. Inside a cell errors could be produced resulting from parallel processing with a 16-bit width. Therefore in a test connection the two kinds of test cells TYPE-1 and TYPE-0 are used alternately and in predetermined or arbitrary order.

Figure 2:
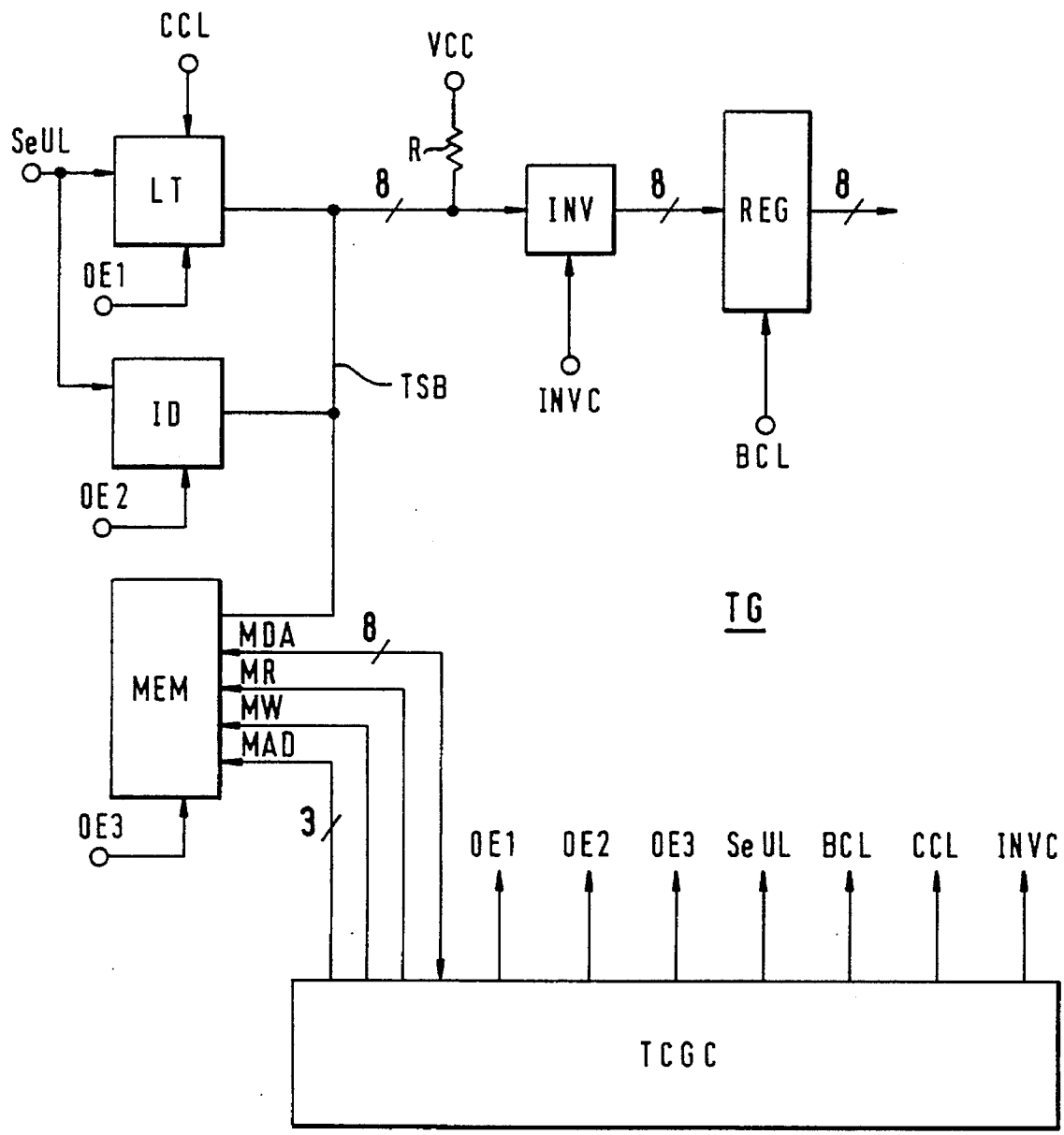
FIG. 2 represents a block diagram of a test cell generator according to the invention.

FIG. 2 shows an embodiment of a test cell generator by which the above described ATM cells may be generated.

The test cell generator TG includes a control circuit TCGC, a read and write memory MEM, a connection number generator ID, a clock LT, a three-state bus TSB having a width of 8 bits, an inverter INV and an output register REG.

The clock circuit LT, the connection number generator ID and the memory MEM are provided with three-state outputs which are able to be activated via activation inputs OE1, OE2, OE3 with the help of the like named activation signals OE1, OE2, OE3. The leads of the three-state bus TSB are connected to the supply voltage VCC via resistances R. The clock circuit LT and the connection number generator ID are provided with an inverting input SeUL via which and by means of a like named inversion signal SeUL an inversion from high value to low value data bytes and vice-versa may be realized. The clock circuit LT is controlled by the cell clock circuit CCL, whilst the output register REG is controlled by the byte clock BCL. The inverter INV may be switched between the non inverting and the inverting condition by means of a signal INVC. The memory MEN may transmit data via the bus TSB as well as to the control circuit TCGC or receive data from this circuit. To this end an 8-bit wide bidirectional data connection MDA is provided between both circuits and between the control circuit TCGC and the memory MEM a three bit wide address connection, a write lead NM and a read lead MR are foreseen.

Next to the connections to the memory already mentioned the control circuit TCGC is also provided with outputs OE1, OE2, OE3 for the activating signals OE1, OE2 and OE3 and for the activation of the three-state outputs, with an output SeUL for the like named inversion signal SeUL, with outputs CCL and BCL for the cell clock CCL and the byte clock BCL, and with the output INVC for the signal INVC controlling the inverter INV.

The octets of the cell header H are generated by the memory MEM and fed through the inverter INV without inversion. The two following octets, MCT and $\overline{MCT}$, are generated by the memory MEM two times after each other in the non-inverse form and are fed through the inverter once without inversion and once with inversion. The flags FL are formed with the help of the resistances R when the three-state outputs are not activated, and then by alternate non-inversion and inversion in the inverter INV. The time indication is provided by the clock circuit LT, the sequence number is generated by the memory MEM and the connection number is provided by the connection number generator ID. Hereby each time the high value data byte is generated twice and the low value data byte is generated twice, and fed through the inverter once without inversion and once with inversion. The sequence number stored in the memory MEM is registered in the control circuit TCGC after each complete transmission, it is then incremented by one and then reloaded in memory MEM.

The subsequent flags are obtained in the same way as the first flags.

The control circuit TCGC essentially operates in the same way as a known programming circuit, requiring a counter and a programme memory. To these circuits an adder circuit for incrementing the sequence number as well as known devices for providing the timing have to be added.

Figure 3:
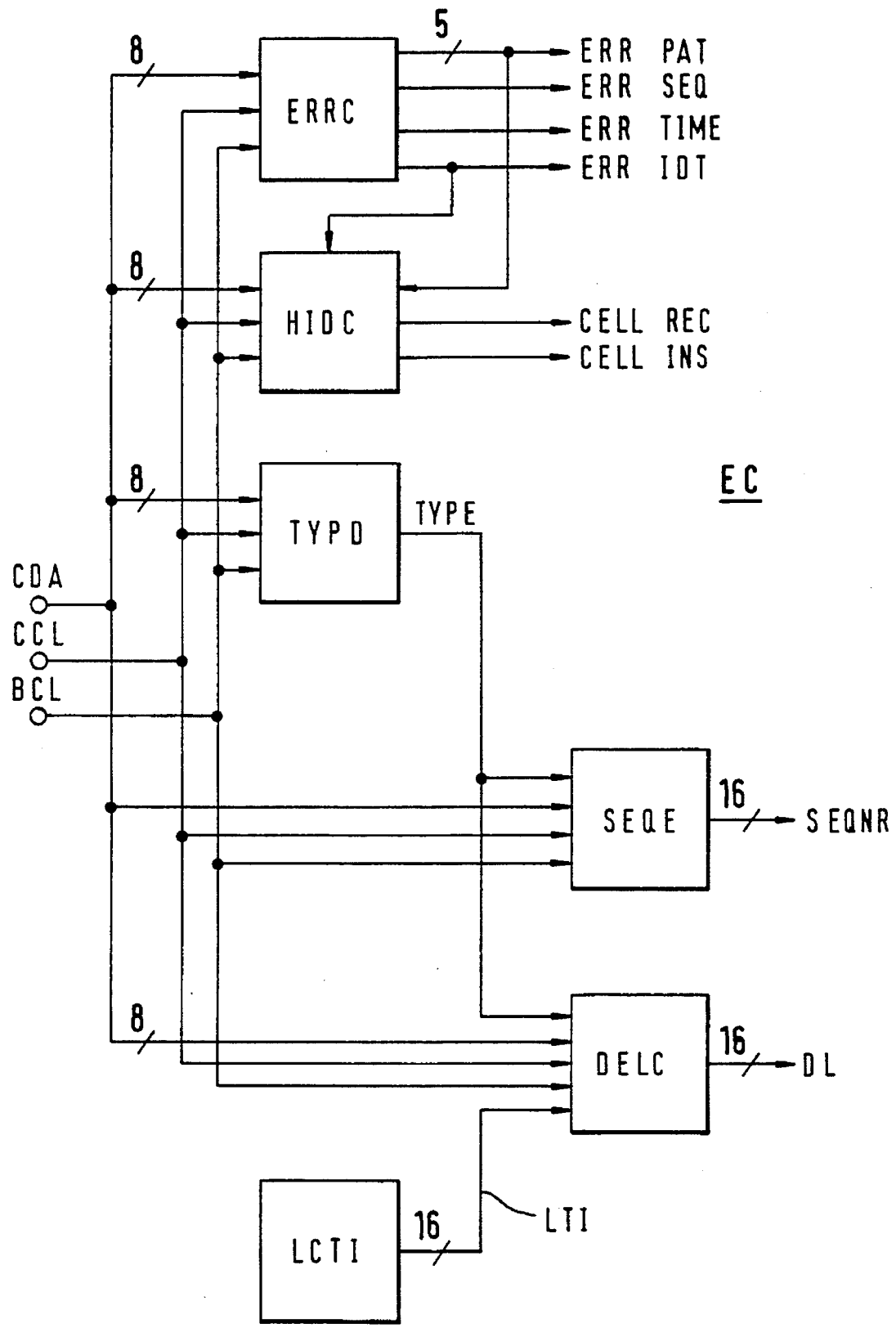
FIG. 3 shows a block diagram of an evaluation circuit according to the invention.

FIG. 3 shows a possible embodiment of an evaluation circuit EC for testing ATM test cells. This evaluation circuit EC includes a circuit ERRC for fault recognition, a circuit HIDC for e.g. cell header recognition, a circuit TYPD for cell type recognition, a clock LCTI, a circuit SEQE for determining the sequence number, and a circuit DELC for determining a relative or absolute transfer time.

The fault recognition circuit ERRC investigates if octets occur in associated pairs which are mutually inverted. To this end a memory, an inverter and a comparison circuit are required for each of the eight bits. The errors occurring within an ATM test cell are counted, the counter position of this counter constituting the signal ERR PAT. Further signals are provided: ERR SEQ when an error occurs in the sequence number; ERR TIME when an error occurs in the time indication, and ERR ID when an error occurs in the sequence number. The signals ERR PAT and ERR ID are also transmitted to the circuit for cell header recognition HIDC.

The so called cell header recognition circuit HIDC compares the five bytes of the cell header of an incoming cell with the five bytes of a reference cell, the header bytes each including a pair of above mentioned bits, PT, which are activated when test or maintenance cells are concerned and which are not activated in the case of data cells. Hereby the output CELL REC is activated when :

PT is activated and when not only the five bytes of the header unit also but also the MCT and $\overline{MCT}$ bytes are equal; or when PT is not activated and the five bytes of the header are equal.

When CELL REC is activated then the sequence number of the incoming cell is compared with that of the reference cell and the output CELL INS is thereby activated when:

these connection numbers are different and there are no errors in the connection number of the incoming cell;

the last mentioned connection number is erroneous and the signal ERR PAT moreover exceeds a predetermined threshold.

The circuit for cell type recognition TYPD distinguishes between cells of type TYPE-1 and cells of TYPE-0 and produces a signal TYPE indicating the cell type. The circuit SEQE for determining the sequence number extracts the sequence number as a 16-bit signal SEQ NR in function of the signal TYPE.

The circuit DELC for determining the relative or absolute transfer time DERLC extracts the time indication TS from the cell in function of the signal TYPE, subtracts it from the local time LTI of the clock LCTI and produces at its output the difference as a 16-bit signal DL. When the clock circuit LT in the test cell generator T6 and the clock LCTI in the evaluation circuit are not running in synchronism the absolute transfer time cannot be obtained. However, for a sequence of test calls the relative transfer time differences may be obtained in this way and these transfer time differences are in general of greater importance than the absolute values of the transfer times.

By the above invention all means are provided for testing the characteristics of an ATM connection.

While the principles of the invention have been described above in connection with specific apparatus, it is to be clearly understood that this description is made only by way of example and not as a limitation on the scope of the invention.

We claim:

1. A method for testing the characteristics of an ATM connection between two points of an ATM network, characterized by the steps of transmitting a sequence of test cells and testing the ATM connection using said sequence of test cells, each one of said test cells having an information part for the purpose of recognizing predetermined characteristics of the ATM connection during said step of testing.

2. A method according to claim 1, characterized in that the information part of each test cell comprises a plurality of pairs of bytes, the second byte in each pair of bytes being an inverse of the first byte in each pair of bytes.

3. A method according to claim 2, characterized in that said plurality of pairs of bytes are interwoven in such a way that the first bytes in each pair of bytes is immediately followed by the associated second byte in each pair of bytes.

4. A method according to claim 1, characterized in that the information part includes information, and that the information includes at least: a time indication of a transmission time (TS) of said test cell, a sequence number (SN) indicative of the sequence that said test cell was transmitted in the ATM connection, and a connection number (ID) indicative of the identity of the ATM connection, said transmission time (TS), said sequence number (SN) and said connection number (ID) each being transmitted as pairs of bytes with the second byte in each pair being an inverse of the first byte in each pair.

5. A method according to claim 4 wherein the first byte in each of said pairs of bytes contains the information and the second byte in each of said pairs of bytes contains an inverse of the information.

6. A method according to claim 5 wherein the information part further includes an indication (FL) that said first byte in each of said pairs of bytes contains the information.

7. A method according to claim 4 wherein the first byte in each of said pairs of bytes contains an inverse of the information and the second byte in each of said pairs of bytes contains the information.

8. A method according to claim 7 wherein the information part further includes an indication (FL) that said first byte in each of said pairs of bytes contains the inverse of the information.

9. A test cell generator for generating a data sequence of an ATM test cell for use by an evaluation circuit for testing the characteristics of an ATM connection between two points of an ATM network, characterized by:

device means for generating a plurality of bytes, and inverter means responsive to said plurality of bytes for selectively, and at least piece wise, providing said bytes in non-inverse form or in inverse form, and wherein said data sequence is provided as an output of said inverter means.

10. A test cell generator according to claim 9, characterized in that said plurality of bytes are provided as octets by said device means.

11. A test cell generator according to claim 10, characterized in that said inverter means inverts every other octet of said data sequence.

12. A test cell generator according to claim 11, characterized in that said device means include: a clock circuit (LT) controlled by a cell clock (CCL) for providing a time indication indicative of the transmission time (TS) of the test cell; a connection number generator (ID) for providing a connection number (ID) indicative of the identity of the ATM connection being tested; a write and read memory (MEM) for providing a sequence number (SN) indicative of the sequence the cell will be generated; a control circuit (TCGC) for controlling said cell clock (LT), said connection number generator (ID) and said write and read memory (MEM); and an output register (REG) for providing the test cell to the ATM connection, and further characterized in that said inverter device includes a switchable inverter (INV).

13. A test cell generator according to claim 12, characterized in that the clock circuit (LT), the connection number generator (ID) and the write and read memory (MEM) are all coupled with the output register (REG) via said switchable inverter (INV).

14. A test cell generator according to claim 13, characterized in that each test cell includes an information part, and that the information part of each test cell includes at least: a time indication (TS) of the sending time; a sequence number (SN) in an ATM connection; and a connection number (ID), provided by the clock circuit (LT), the write and read memory (MEM) and the connection number generator (ID) respectively.

15. A test cell generator according to claim 13, characterized in that each test cell also includes a header and that said write and read memory (MEM) also provides the headers of the test cells under the control of the control circuit.

16. An evaluation circuit for testing ATM test cells generated by a test cell generator, the test cells being transmitted onto an ATM connection by the test cell generator at one point in an ATM network and received from the ATM connection at another point in the ATM network, the ATM network being used to transmit test cells, maintenance cells and data cells, each test, maintenance and data cell including a corresponding cell header and information part, said evaluation circuit comprising:

a cell header recognition circuit (HIDC) to compare the corresponding cell header of a test cell, a maintenance cell or a data cell with a header of a reference cell, said reference cell also including an information part, each test, maintenance and data cell header containing a first cell indication (PT) which contains activation data if the cell is a test or maintenance cell, and each test, maintenance, data and reference cell information part containing at least a second cell indication (MCT, $\overline{MCT}$) which contains activation data if the cell is a test cell, and means responsive to an incoming test cell header and said reference cell header being equal and to the first cell indication (PT) of said incoming test cell containing activation data, for comparing the second cell indications (MCT, $\overline{MCT}$) of said incoming test cell and said reference cell, said means being further responsive to the second cell indication of said incoming test cell being equal to the second cell indication of said reference cell for providing a first output signal (CELL REC) which indicates that the incoming test cell has to be evaluated further.

17. An evaluation circuit according to claim 16, characterized in that said information part of a test cell comprises a plurality of pairs of octets, one octet in each pair of octets being the inverse of the other octet in the pair of octets, and that the evaluation circuit further includes a circuit (TYPD) responsive to a test cell for determining if a first octet or a second octet in a pair of octets is inverted.

18. An evaluation circuit according to claim 16, characterized in that each test cell includes a time indication (TS) indicative of a sending time of the test cell by a test cell generator, that the evaluation circuit includes a clock for providing a local time indication (LCTI), and that the evaluation circuit is further provided with a circuit (DELC) responsive to a test cell for extracting said time indication (TS) and responsive to said local time indication (LCTI) for providing a time difference signal indicative of the difference between said time indication (TS) and said local time indication (LCTI).

19. An evaluation circuit according to claim 16, characterized in that said cell header recognition circuit (HIDC) provides said first output signal (CELL REC) when the test cell header and the reference cell header are equal, provided that the first cell indication (PT) of the test cell does not contain activation data.

20. An evaluation circuit according to claim 19, including an error recognition circuit (ERRC) to detect and correct bit errors, and a counter which is incremented in response to the detection of a bit error, the magnitude of a count in said counter being indicated by a third output signal (ERR PAT).

21. An evaluation circuit according to claim 20, characterized in that said error recognition circuit (ERRC) also checks the bit errors in a connection number of an incoming test cell, and upon detection of an error, provides a fourth output signal (ERR ID) controlling said cell header recognition circuit (HIDC).

22. An evaluation circuit according to claim 21, characterized in that the cell header recognition circuit, when providing the first output signal (CELL REC) compares a connection number (ID) of said incoming test cell with a connection number (ID) of said reference cell and generates an activated second output signal (CELL INS) when these connection numbers are different and said fourth output signal (ERR 10) was not generated, said activated second output signal (CELL INS) indicating an error.

23. An evaluation circuit according to claim 21, characterized in that the cell header recognition circuit is responsive to the provision of the first output signal (CELL REC) for comparing a connection number (ID) of the incoming test cell with a connection number (ID) of the reference cell and for providing an activated second output signal (CELL INS) when these connection numbers are different and said forth output signal (ERR ID) has not been provided, said activated second output signal (CELL INS) indicating an error, and further characterized in that the second output signal (CELL INS) is provided in response to the provision of the first output signal (CELL REC) and the fourth output signal (ERR ID) and in response to said count exceeding a predetermined threshold.

24. An evaluation circuit according to claim 16, characterized in that the cell header recognition circuit, in response to providing the first output signal (CELL REC), compares a connection number (ID) of said incoming test cell with a connection number (ID) of said reference cell and generates an activated second output signal (CELL INS) when these connection numbers are different and there are no errors in the connection number of said incoming test cell, said activated second output signal (CELL INS) indicating an error.

25. A system for testing the characteristics of an ATM connection between two points of an ATM network, the ATM network being used to transmit test cells, maintenance cells and data cells, each test, maintenance and data cell including a corresponding cell header and information part, said system comprising:

a test cell generator for generating a data sequence of ATM test cells, said test cell generator having:

device means for generating a plurality of bytes, and inverter means responsive to said plurality of bytes for selectively, and at least piece wise, providing said bytes in non-inverse form or in inverse form, wherein said data sequence is provided as an output of said inverter means, said test cell generator transmitting the ATM test cells onto the ATM connection at one point in the ATM network; and an evaluation circuit for testing the ATM test cells received from the ATM connection at another point in the ATM network, said evaluation circuit having a cell header recognition circuit (HIDC) to compare a corresponding cell header of a test cell, a maintenance cell or a data cell with a header of a reference cell, said reference cell also including an information part, each test, maintenance and data cell header containing a first cell indication (PT) which contains activation data if the cell is a test or maintenance cell, and each test, maintenance, data and reference cell information part containing at least a second cell indication (MCT, $\overline{\text{MCT}}$) which contains activation data if the cell is a test cell, and means responsive to an incoming test cell header and said reference cell header being equal and to the first cell indication (PT) of said incoming test cell containing activation data, for comparing the second cell indications (MCT, $\overline{\text{MCT}}$) of said incoming test cell and said reference cell, said means being further responsive to the second cell indication of said incoming test cell being equal to the second cell indication of said reference cell for providing a first output signal (CELL REC) which indicates that the incoming test cell has to be evaluated further.

\* \* \* \* \*

UNITED STATES PATENT AND TRADEMARK OFFICE
CERTIFICATE OF CORRECTION

PATENT NO. : 5,570,357
DATED : October 29, 1996
INVENTOR(S) : Van Tetering et al.

It is certified that error appears in the above-indentified patent and that said Letters Patent is hereby corrected as shown below:

Column 8, line 17 (claim 25) "information pan," should read --information part,--

Cover page of patent, line 2 "van Tetering et al." should read --Van Tetering et al.--

Cover page of patent at "[75] Johannes A. M. van Tetering" should read --[75] Johannes A.M. Van Tetering--

Signed and Sealed this

Twenty-eighth Day of January, 1997

Attest:

BRUCE LEHMAN

Attesting Officer     Commissioner of Patents and Trademarks